United States Patent Office

3,625,050
Patented Dec. 7, 1971

3,625,050
EQUIPMENT FOR DETERMINING THE MELT VISCOSITY OF THERMOPLASTICS
Wolfram Noetzel and Theodor Daur, Ludwigshafen, Germany, assignors to Badische Anilin- & Soda-Fabrik Aktiengesellschaft, Ludwigshafen (Rhine), Germany
Filed July 18, 1969, Ser. No. 843,140
Claims priority, application Germany, July 20, 1968,
P 17 73 874.8
Int. Cl. G01n *11/06*
U.S. Cl. 73—56
4 Claims

ABSTRACT OF THE DISCLOSURE

Equipment for determining the melt viscosity of thermoplastics consisting of a cylindrical tube with an orifice provided at the lower end, and a weighted plunger which is introduced into the tube after the plastics material to be tested has been charged into the same.

---

Figure 1:
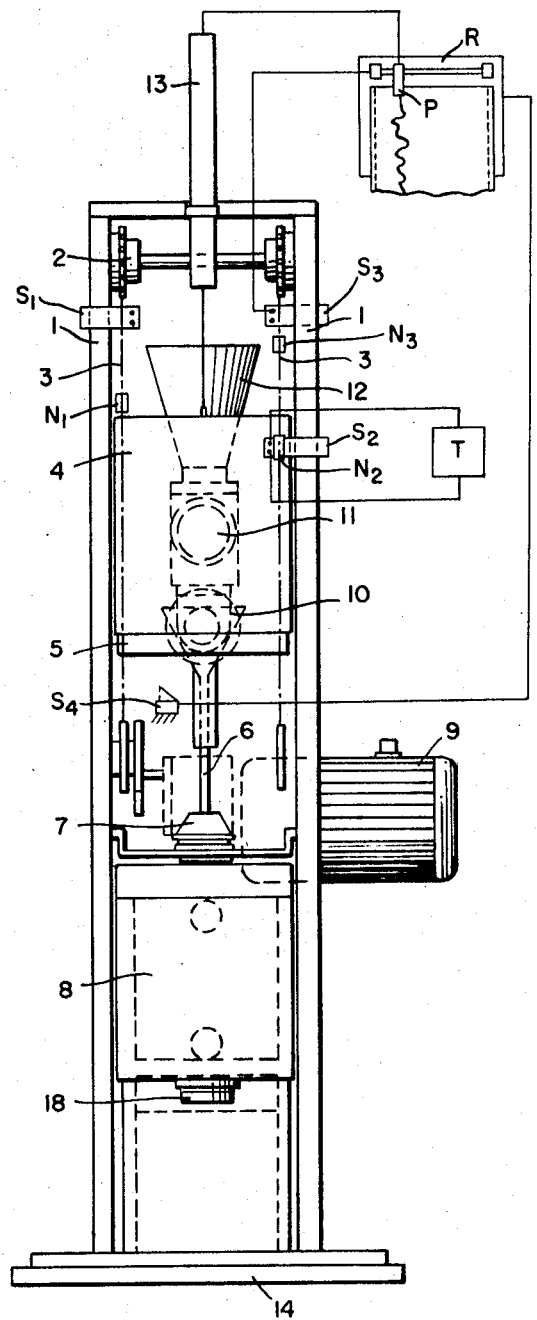

The invention relates to equipment for determining the melt viscosity of thermoplastics comprising a cylindrical tube provided with an orifice at the lower end, and a weighted plunger which is introduced into the tube after the plastics material to be tested has been charged into the same, the weighted plunger being coupled with a device which actuates a travel recording instrument (hereinafter referred to as "travel recording device") and the moving unit consisting of the weighted plunger and the travel recording device (hereinafter referred to as "pressure unit") controlling in cycles via switches the inward and outward movement of the plunger.

Metering and charging of the plastics material to be tested into the tube is carried out by mechanical means which is controlled in cycles by the pressure unit.

Equipment for determining the melt viscosity of thermoplastics is known in which the plastics material to be tested is introduced in heated condition into a cylindrical tube and forced by means of a weighted plunger through an orifice located at the lower end thereof. The strand of plastics material issuing from the orifice is cut off at specific intervals, allowed to cool and weighed. The amount of material which issues from the orifice (calculated in g./10 minutes) serves as a measure of the flow properties of the plastics material being tested, which is also designated as the melt index. At a fixed plunger diameter of 9.5 mm., a total load of 2.16 kg. (plunger+weight) is used for low-viscosity plastics, and a total load of 21.6 kg. for extremely high-viscosity plastics.

Since determination of the melt index is the quickest and simplest method of determining the mean molecular weight of thermoplastics, it has great importance for continuous control. However, prior art equipment exhibits various disadvantages so that it is unsuitable for carrying out the continuous and fully automatic determination of the melt index. Thus for example the previously weighed plastics material to be tested has to be loaded into the equipment by hand, the exact maintenance of the melting time of the plastics material with and without subjecting it to a load has to be checked with a stopwatch and the cut-off times of the plastics material issuing from the orifice also have to be measured with a stopwatch. Finally, each cut-off is weighed on an analytical balance and the melt index calculated in g./10 minutes. All these operations must be carried out with the greatest accuracy because they are error-prone. In the case of extremely high-viscosity plastics samples there is added to the said difficulties that of lifting off and putting on the load of 21.6 kg. by hand.

It is therefore the object of the invention to provide equipment for determining the melt index of thermoplastics with which the whole procedure of determining the melt index in commercial operations, beginning with the taking of samples of product up to the recording of the measured melt index, is carried out continuously and automatically and which does not have the said disadvantages.

This object is achieved according to this invention by equipment in which the weighted plunger is coupled with a travel recording device, the pressure unit controlling in cycles via switches the inward and outward movement of the plunger, and in which the metering and charging of the plastics material to be tested into the tube is carried out by mechanical means which is also controlled in cycles by the pressure unit.

The travel recording device may consist for example of two electrical contacts provided on the plunger or on the weight which measure by means of a time measuring device the time required for the plunger to travel a certain distance, or may be an inductive measuring instrument rigidly attached to the weight. In a particularly advantageous embodiment of the invention the pressure unit can be moved vertically by lifting means. It is also advantageous in the operation of the equipment according to the invention for the recording instrument controlled by the travel recording device to be switched off when the tube is being filled or when the plunger is not subjected to a load.

One embodiment of the equipment according to this invention is illustrated in the drawings and will now be described in greater detail.

Figure 2:
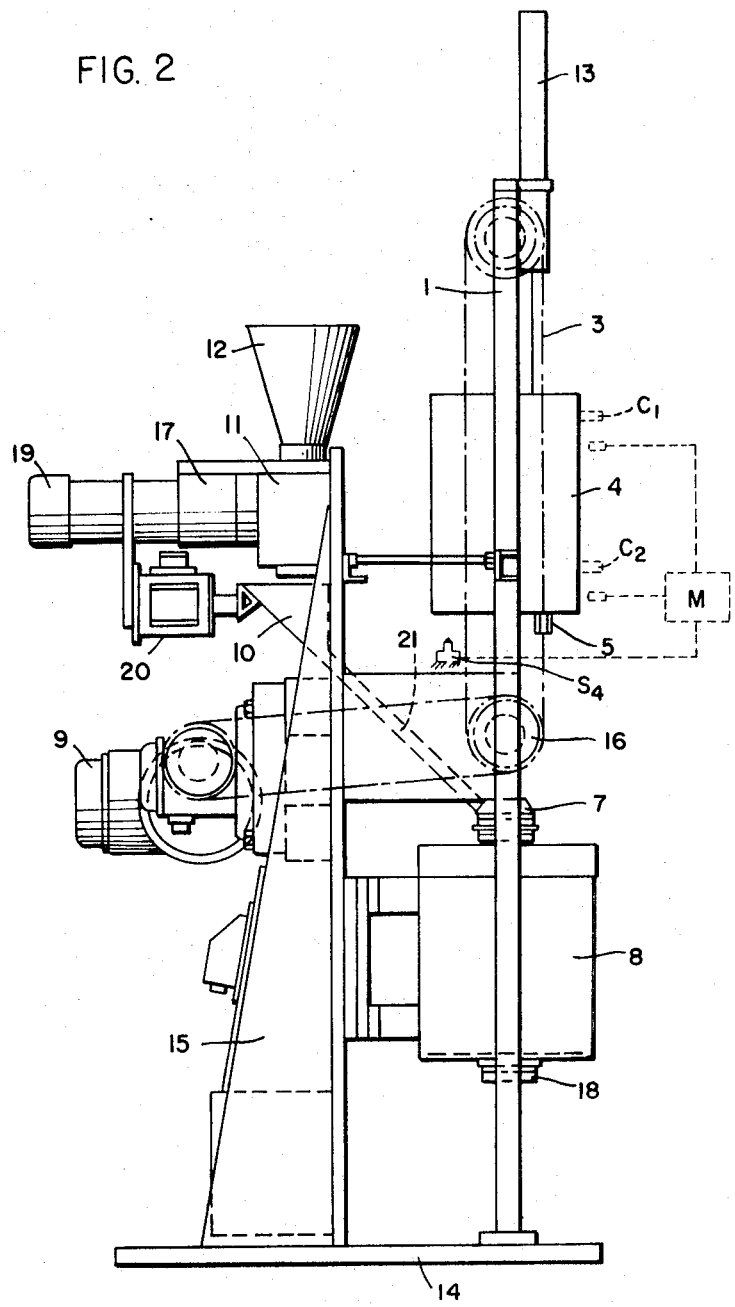

FIG. 1 is the front view of the apparatus, and
FIG. 2 is a side view of the apparatus.

The equipment according to the invention is composed according to FIGS. 1 and 2 essentially of three elements, namely an electrically heated oven 8, lifting means 16 controlling the inward and outward movement of the plunger 6, and metering means 17 for the plastics material to be tested, which are connected together by way of guide rails 1 secured to a base plate 14 and a supporting frame 15.

The electrically heated oven contains the measuring unit proper consisting of a cylindrical tube provided with an orifice 18 at the lower end. A guiding sleeve for the plunger 6 which moves in and out of the tube is mounted on the open upper end of the tube.

The lifting means 16 consists of two chains 3 supported on rollers 2 and driven by a gear motor 9. The pressure unit is attached to the chains 3 in such a way that it can move vertically when the chains 3 are driven. The weight 4 which is exchangeable rests on a crossbeam 5 attached to the chains 3 and is loosely guided by the guide rails 1. The gear motor 9 is controlled by limit switches $S_1$–$S_4$ which are actuated by cams $N_1$–$N_3$ provided on the chains 3 and by the weight 4. The travel recording device 13 is an inductive measuring instrument which indicates the distance travelled by the weight 4 in a specific time, i.e. the rate at which the weight 4 descends.

The sample of plastics material is charged into the equipment via metering means 17 comprising a supply hopper 12, a ball stopcock 11 driven by a motor 19, a discharge hopper 10 provided with vibrating means and a feed pipe 21 joining the discharge hopper 10 with the guiding sleeve 7.

When the equipment is switched on, the plastics material which may be in the form of powder, coarse powder or granules is first fed into the feed hopper 12 of the metering means 17. During the upward movement of the weight 4 attached to the chains 3 of the lifting means 16, the switch $S_1$ is actuated by the cam $N_1$ or by the weight 4 and sets in operation the motor 19 used to drive the ball stopcock 11. The stopper of the stopcock 11 has a blind hole into which the plastics material to be tested passes from the feed hopper 12. The volume of the blind hole can be adjusted by exchangeable plates depending on the bulk density of the plastics material to be tested so that the tube is filled to the desired degree. When the motor 19 is started up, the stopper of the ball stopcock 11 is rotated once about its axis so that the measured amount of plastics material passes into the discharge hopper 10. Meanwhile the weight 4 has reached its uppermost position. The plunger 6 attached to the weight 4 is thus withdrawn from the tube so that the opening in the feed pipe 21 beading to the guiding sleeve 7 is freed. The measured amount of plastics material which has fallen into the discharge hopper 10 can now pass through the filling pipe 21 into the tube assisted by the vibrating means in the form of an A.C. magnet.

After charging has been completed, the weight 4 moves down until the plunger rests on the plastics material in the cylindrical tube. The weight 4 is held in this position by means of a time switch $T_2$ during the prescribed heating-up period for the plastics material. Then the pressure unit descends to its lower limit of travel. The drive for advancing the paper of a recorder not shown in the drawing is switched on by a cam $N_3$ on the pressure unit or on the chains 3. The weight 4 resting on the plunger 6 is released and moves down at the rate at which the molten plastics material issues from the orifice 18. The travel of the plunger 6 is recorded by the recording pen P on the paper advancing at a predetermined rate via the inductive travel recording device 13 coupled with the pressure unit.

The gradient of the curve recorded on the paper corresponds (at a constant rate of advance of the paper) to the rate of extrusion of the plastics material and is thus a direct measure of the melt index.

In order to simplify recording a time measuring device M which is actuated by two contacts $C_1$, $C_2$ provided on the plunger 6 or on the weight 4 may be used instead of the inductive travel recording device 13.

When the plunger reaches its lower limit of travel, the weight 4 actuates the switch $S_4$ which switches off the recording pen P, sets in operation the lifting means 16 for removing the plunger 6 from the tube and thus initiates the next run.

In continuous operation the rinsing of the tube with the first runnings of the following sample is sufficient. The cylindrical tube can be easily removed and exchanged for occasional cleaning or when the product is charged. For this purpose, with the weight 4 in its uppermost position, the plunger 6 is unscrewed, the discharge hopper 10 with the filling pipe 21 is detached and the guiding sleeve 7 provided with a bayonet joint is disengaged. The cylindrical tube can then be withdrawn from the oven 8.

The particular advantage of the automatic procedure according to the invention over the prior art batchwise-manual method is that reliability of the measurements is increased because time is accurately maintained and errors resulting from the cutting off and weighing of the extruded samples cannot arise. Through the continuous recording to the rate of extrusion it is possible with the apparatus according to the invention to detect and follow alterations in the melt viscosity, for example by reason of degradation or crosslinking of the plastics material, during measurement.

When the equipment according to the invention is used in a production plant, the metering means can be attached direct to a product line. The connection used for the purpose should be as short as possible so that fresh product is always available for measurement. By additional calculation of the volume of plastics material issuing from the orifice and by cutting off and weighing the extruded portion, the density of the melt can also be determined. The equipment according to the invention may be housed in a cabinet provided with separate ventilation in order to prevent explosions in plants where an explosion hazard exists.

We claim:
1. A device for continuously and automatically determining the melt viscosity of thermoplastic materials, said device comprising in combination:
   (1) a cylindrical tube having an open upper end and an orifice at its lower end;
   (2) metering means for passing a measured amount of thermoplastic material into said cylindrical tube;
   (3) a pressure unit arranged for vertical movement within said tube, said pressure unit including a plunger and a weight operatively attached to said plunger, said plunger moving at a rate determined by the passage of said thermoplastic material through said orifice;
   (4) heating means associated with said tube for heating said thermoplastic material;
   (5) a travel recording device operatively associated with said pressure unit for measuring the length of time needed for said plunger to move a given distance downward within said tube;
   (6) recording means operatively associated with said travel recording device for visibly indicating the length of time needed for said plunger to move said given distance within said cylindrical tube;
   (7) lifting means for automatically withdrawing said plunger from said cylindrical tube after said plunger has reached a given point within said tube; and
   (8) switching means for activating said metering means when said plunger has been withdrawn from said cylindrical tube and for releasing said pressure unit for passage through said cylindrical tube when the temperature of said thermoplastic material within said cylindrical tube has reached a given level.

2. Equipment as claimed in claim 1 wherein the travel recording device consists of two electrical contacts provided on the weight which measure by means of a time measuring device the time required for the plunger to travel a certain distance.

3. Equipment as claimed in claim 1 wherein the travel recording device is an inductive measuring instrument rigidly attached to the weight.

4. Equipment as claimed in claim 1 wherein the recording instrument controlled by the travel recording device is switched off when the tube is being filled or when the plunger is not subjected to a load.

References Cited

UNITED STATES PATENTS

| | | | |
|---|---|---|---|
| 3,203,225 | 8/1965 | Sieglaff et al. | 73—56 X |
| 3,270,553 | 9/1966 | Ballman et al. | 73—56 |
| 3,360,986 | 1/1968 | Rothschild | 73—56 |

FOREIGN PATENTS

| | | | |
|---|---|---|---|
| 1,493,477 | 9/1967 | France | 73—56 |
| 681,197 | 10/1952 | Great Britain | 73—56 |
| 148,267 | 6/1962 | U.S.S.R. | 73—56 |

LOUIS R. PRINCE, Primary Examiner

J. W. ROSKOS, Assistant Examiner